(12) United States Patent
McDougald et al.

(10) Patent No.: US 7,074,371 B2
(45) Date of Patent: *Jul. 11, 2006

(54) MULTIPHASE MIXING DEVICE WITH IMPROVED QUENCH INJECTION

(75) Inventors: Neil K. McDougald, Tracy, CA (US); Gregory P. Muldowney, Glen Mills, PA (US); Sherri L. Boyd, Robbinsville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 364 days.

This patent is subject to a terminal disclaimer.

(21) Appl. No.: 10/439,963

(22) Filed: May 16, 2003

(65) Prior Publication Data

US 2004/0228779 A1 Nov. 18, 2004

(51) Int. Cl.
*B01J 8/04* (2006.01)
*B01J 19/00* (2006.01)

(52) U.S. Cl. ...................... 422/191; 422/194; 422/195; 422/220; 422/224; 239/558; 261/97

(58) Field of Classification Search ................ 422/190, 422/191, 194, 195, 220, 224; 239/558; 261/97
See application file for complete search history.

(56) References Cited

U.S. PATENT DOCUMENTS

| | | | |
|---|---|---|---|
| 3,787,189 A | | 1/1974 | Muffat et al. |
| 4,836,989 A | * | 6/1989 | Aly et al. ................... 422/195 |
| 4,960,571 A | * | 10/1990 | Bhagat et al. .............. 422/194 |
| 5,152,967 A | * | 10/1992 | Rossetti et al. ............ 422/194 |
| 5,403,560 A | * | 4/1995 | Deshpande et al. ......... 422/190 |
| 5,462,719 A | * | 10/1995 | Pedersen et al. ............ 422/195 |
| 5,554,346 A | * | 9/1996 | Perry et al. ................. 422/195 |
| 5,567,396 A | * | 10/1996 | Perry et al. ................. 422/190 |
| 5,635,145 A | * | 6/1997 | Den Hartog et al. ....... 422/191 |
| 5,690,896 A | * | 11/1997 | Stangeland et al. ........ 422/191 |
| 5,837,208 A | * | 11/1998 | Grott et al. ................. 422/195 |
| 5,935,413 A | * | 8/1999 | Boyd et al. .................. 208/49 |

(Continued)

FOREIGN PATENT DOCUMENTS

EP 0 462 753 A1 12/1991

(Continued)

OTHER PUBLICATIONS

Co-pending application entitled, "Improved Multiphase Mixing Device with Baffles." (U.S Appl. No. 10/341,123, filed on Jan. 13, 2003).

(Continued)

*Primary Examiner*—N. Bhat
(74) *Attorney, Agent, or Firm*—Glenn T. Barrett

(57) ABSTRACT

A mixing system is disclosed which provides improved multiphase mixing through the use of a novel quench injection means. The mixing system comprises a horizontal collection tray, a mixing chamber positioned below the collection tray, and at least one passageway extending through the collection tray into the mixing chamber. The mixing chamber and the collection tray define a two-phase mixing volume. The passageway conducts fluid from above the collection tray into the mixing chamber. The mixing chamber preferably includes at least one outlet opening for the downward passage of fluid. In particular, mixing of quench fluid is significantly improved when quench is introduced into a region above the collection tray and where (i) lateral velocities of the process fluids are low, (ii) sufficient volume is available for the quench fluid to mix with the process fluids, and (iii) quench injection occurs opposite the prevailing direction of process fluid flow.

16 Claims, 7 Drawing Sheets

U.S. PATENT DOCUMENTS

| | | |
|---|---|---|
| 6,180,068 B1 * | 1/2001 | Boyd et al. ................. 422/195 |
| 6,186,658 B1 * | 2/2001 | Nishida et al. .......... 366/173.2 |
| 2002/0172632 A1 | 11/2002 | Chou |
| 2002/1726322 | 11/2002 | Chou |
| 2004/0037759 A1 * | 2/2004 | Van Vliet et al. ........... 422/195 |

FOREIGN PATENT DOCUMENTS

| | | |
|---|---|---|
| EP | 0472335 | 2/1992 |
| EP | 0663236 | 7/1995 |
| EP | 0716881 | 6/1996 |

OTHER PUBLICATIONS

Co-pending application entitled, "Multiphase Mixing Device with Improved Quench Injection for Inducing Rotational Flow".

Co-pending application entitled, "Improved Multiphase Mixing Device with Staged Gas Introduction" (U.S. Appl. No. 10/358,760, filed on Feb. 5, 2003).

* cited by examiner

MULTIPHASE MIXING DEVICE WITH IMPROVED QUENCH INJECTION

FIELD OF THE INVENTION

The present invention relates generally to systems for mixing process gases and liquids and more specifically to interbed quench and mixing systems involving cocurrent downflow reactors using fixed hardware.

BACKGROUND OF THE INVENTION

Downward flow reactors are used by the chemical and refining industries in a variety of processes, such as hydrotreating, hydrofinishing and hydrocracking. A typical downward flow reactor has a cylindrical outer wall with a catalyst bed positioned within the reactor. The catalyst bed generally rests on a catalyst support grid positioned horizontally within the reactor and spanning the complete diameter of the reactor. The catalyst support grid, together with the outer wall, cooperate to retain the catalyst or other particulate material in place. A distribution tray is positioned horizontally within the reactor at a location above the catalyst bed for evenly distributing process fluids onto the catalyst. The catalyst support grid, outer reactor wall and the distribution tray define the volume of the catalyst bed.

Multiple bed reactors are commonly used. They are formed by providing two or more such catalyst beds spaced along the longitudinal axis of the reactor. The region between successive catalyst beds defines an interbed mixing zone. When a reactor having more than one catalyst bed is used, reactant fluids are introduced into the reactor above the uppermost catalyst bed. The reactant fluids, which typically consist of both liquid and vapor phases, flow through the uppermost catalyst bed.

From the uppermost catalyst bed, unreacted reactant fluids and the related fluid products derived from interaction with the catalyst enter the interbed mixing zone. The interbed mixing zone typically includes a mixing chamber. This interbed mixing zone including a mixing chamber serves several purposes. First, the interbed mixing zone serves as a convenient place through which additional reactants and/or temperature quenching materials can be introduced into the fluid products. In the reactor units described above, heat is released as a result of the reactions between gas and liquid components occurring on the catalyst(s), causing temperature to increase with distance down the bed. In many cases, cool hydrogen-rich gas is introduced between the beds to quench the temperature rise and replenish the hydrogen consumed by the reactions. Secondly, the interbed mixing zone provides a region for mixing the fluid products. Mixing the fluid products prior to reaction in lower catalyst beds ensures more uniform and efficient reactions. In addition, where catalytic reactions are exothermic and temperature control is a critical processing and safety element, mixing of the fluid products within the mixing chamber can be used to eliminate regions of locally high temperature within the fluid products.

The introduction and mixing of quench into the process gas and liquid must be carried out in the interbed space which spans the full vessel diameter, but is often shorter than one vessel radius. Support beams, piping and other obstructions also occupy the interbed region so that unique hardware is required to perform efficient two-phase mixing in what amounts to limited volume.

Poor quench zone performance manifests itself in two ways. First, the quench zone fails to erase lateral temperature differences at the outlet of the preceding bed or, in the worst cases, amplifies them. An effective quench zone should be able to accept process fluids with 50 to 75 degree F. lateral temperature differences or higher and homogenize them sufficiently that differences do not exceed 5 degree F. at the following bed inlet. The second sign of poor performance is that inlet temperature differences following the quench zone increase as the rate of quench gas is raised. This indicates inadequate mixing of cooler gas with the hot process fluids.

Poor quench zone performance limits reactor operation in various ways. When interbed mixing is unable to erase temperature differences, these persist or grow as the process fluids move down the reactor. Hot spots in any bed lead to rapid deactivation of the catalyst in that region which shortens the total reactor cycle length. Product selectivities are typically poorer at higher temperatures; hot regions can cause color, viscosity and other qualities to be off-specification. Also, if the temperature at any point exceeds a certain value (typically 800 to 850 degree F.), the exothermic reactions may become self-accelerating leading to a runaway which can damage the catalyst, the vessel, or downstream equipment. Cognizant of these hazards, refiners operating with poor internal hardware must sacrifice yield or throughput to avoid these temperature limitations. With present day refinery economics dictating that hydroprocessing units operate at feed rates far exceeding design, optimum quench zone design is a valuable low-cost debottleneck.

One important aspect of the overall mixing efficiency of a quench zone is the ability of the system to mix quench fluids with process fluids. The most critical component of quench mixing efficiency is the methodology though which quench fluid is introduced into the system. There have been various improvements in connection with both physical means and operational considerations for introducing quench into the system.

For example, U.S. Pat. No. 5,152,967 discloses a system incorporating an annular mixing box in which rotational flow of the process fluids is created by slotted entrances. Quench fluid is introduced through an annular ring located substantially in the center of the vessel. The ring is fitted with nozzles to direct quench fluid outward along radial paths. Another device, disclosed in U.S. Pat. No. 5,462,719, creates a rotational flow within a mixing box but without significant liquid holdup in the mixing volume. The quench fluid in this design is introduced through a single vertical inlet at the vessel center positioned such that the entering quench impacts a horizontal deflector forcing the quench fluid radially outward.

Other patents which include descriptions of quench introduction techniques include U.S. Pat. No. 5,635,145. In this patent, a swirl device is used to mix gas and several guide channels are used to mix liquid before depositing them on a pre-distribution tray located between the collection tray and the final distributor tray. Quench is introduced through an annular ring located near the outer wall of the vessel with multiple nozzles directing the flow radially inward. Further, in U.S. Pat. No 5,690,896, an interbed mixing system is described in which an annular mixing trough is used to collect and mix liquid on the collection tray. Gas mixing and further liquid mixing are accomplished in a centrally located mixing box in which the fluids flow in a spiral path towards a central opening in the collection tray. Quench is introduced within the liquid phase through two radially outward oriented nozzles located in the annular mixing trough.

While the above mentioned systems may provide significant improvements in process fluid mixing efficiency, they do suffer from less than ideal quench mixing efficiency. For example, the '967 patent and the '719 patent described above both restrict the process flow through at least one opening passing through the collection tray wherein such openings are substantially in the center of the vessel, and also introduce quench in the space above the center of the tray. As a result, in these designs, quench is injected into a region of the vessel where very high transverse velocities are anticipated. As will be discussed below with respect to the present invention, this configuration results in relatively less efficient quench gas mixing.

The '145 patent also forces flow through a central opening in the collection tray, but locates the quench injection means substantially near the wall of the vessel with multiple nozzles directing quench radially inward. In this design, quench may be suitably located in low-velocity region as it is with the present invention, however, the quench fluid does not enter the vessel flowing counter to the transverse velocity of the process fluid and, as such, does not promote mixing between the process and quench fluids. In this design, it is also believed that the quench location may be located too closely to the wall of the vessel, leaving inadequate mixing volume between the injection point and the wall.

The '896 patent again forces flow through the central opening in the collection tray, but flow is forced to follow a roughly spiral path to the opening as a result of baffles placed on the tray. Quench is injected in two locations on the tray separated by 180 degrees. It is believed that at most one of the quench injectors in this design lies within a low-velocity region beneficial to mixing efficiency. Further, the quench injectors in this system direct fluid radially outward, perpendicular to the transverse velocity of the process fluid rather than opposite the transverse velocity of the process fluid.

Another system, disclosed in U.S. Pat. No. 6,180,068, also provides enhanced mixing of quench gas and process fluids within the interbed space. This system employs separate mixing zones for each of two reactants permitting flexibility in mixing conditions while minimizing pressure drop as well as space and volume requirements. However, the efficiency of this device is sensitive to the degree of phase segregation achieved at the interbed inlet and thus may not perform as desired under all conditions and with respect to particular reactant characteristics.

The above and other known mixing systems generally suffer from the fact that there is insufficient space within the mixing chamber to promote intense two-phase mixing. This limits the capability of these systems to homogenize quench fluid with process fluids and to erase temperature differences between fluids from different sections of the reactor. Accordingly, there is a continued need to provide mixing systems that promote intense two-phase mixing. A preferred system also should provide sufficient volume for the vapor phase to mix separately from the liquid phase. Even while satisfying the above criteria, it is preferable that the designated mixing system minimizes the pressure drop within the reactor as well as permitting relatively easy retrofit with existing reactor spatial constraints.

As can generally be surmised from the above discussion, there is a deficiency in the prior art with respect to efficient mixing of quench fluid with process fluids.

SUMMARY OF THE INVENTION

The present invention provides a novel means to provide more effective mixing of quench fluids and process fluids within a reactor vessel. According to the teachings of the present invention, one or more quench injection means are selected to satisfy three criteria either individually or in combination. First, quench is injected at locations where process fluids are at a relatively low velocity rather than where they have started to accelerate toward the openings through the collection tray. Second, quench is injected at locations where there is adequate mixing volume between the injection points and nearby confining surfaces such as the reactor wall. Third, quench is injected in a direction which is opposite and against the prevailing flow of the process fluids.

According to the teachings of the present invention, a mixing system is described with such mixing system comprising a horizontal collection tray, a mixing chamber positioned below the collection tray, and at least one passageway extending through the collection tray into the mixing chamber. The mixing chamber and the collection tray define a two-phase mixing volume. The passageway conducts fluid from above the collection tray into the mixing chamber. The mixing chamber preferably includes at least one outlet opening for the downward passage of fluid. The introduction of one or more baffles within the mixing chamber as described in applicant's co-pending application entitled "Improved Multiphase Mixing Device with Baffles" (application Ser. No 10/341,123, filed on Jan. 13, 2003) may optionally be implemented in accordance with the mixing system described herein so as to obtain the benefits described in that patent application.

As a result of injecting quench at the specific locations and in the specific directions dictated by the teachings of the present invention, significant improvements in mixing efficiency are obtained. In particular, mixing of quench fluid is significantly improved when quench is introduced into a region above the collection tray and where (i) lateral velocities of the process fluids are low, (ii) sufficient volume is available for the quench fluid to mix with the process fluids, and (iii) quench injection occurs opposite the prevailing direction of process fluid flow.

DETAILED DESCRIPTION OF THE INVENTION

Figure 1:
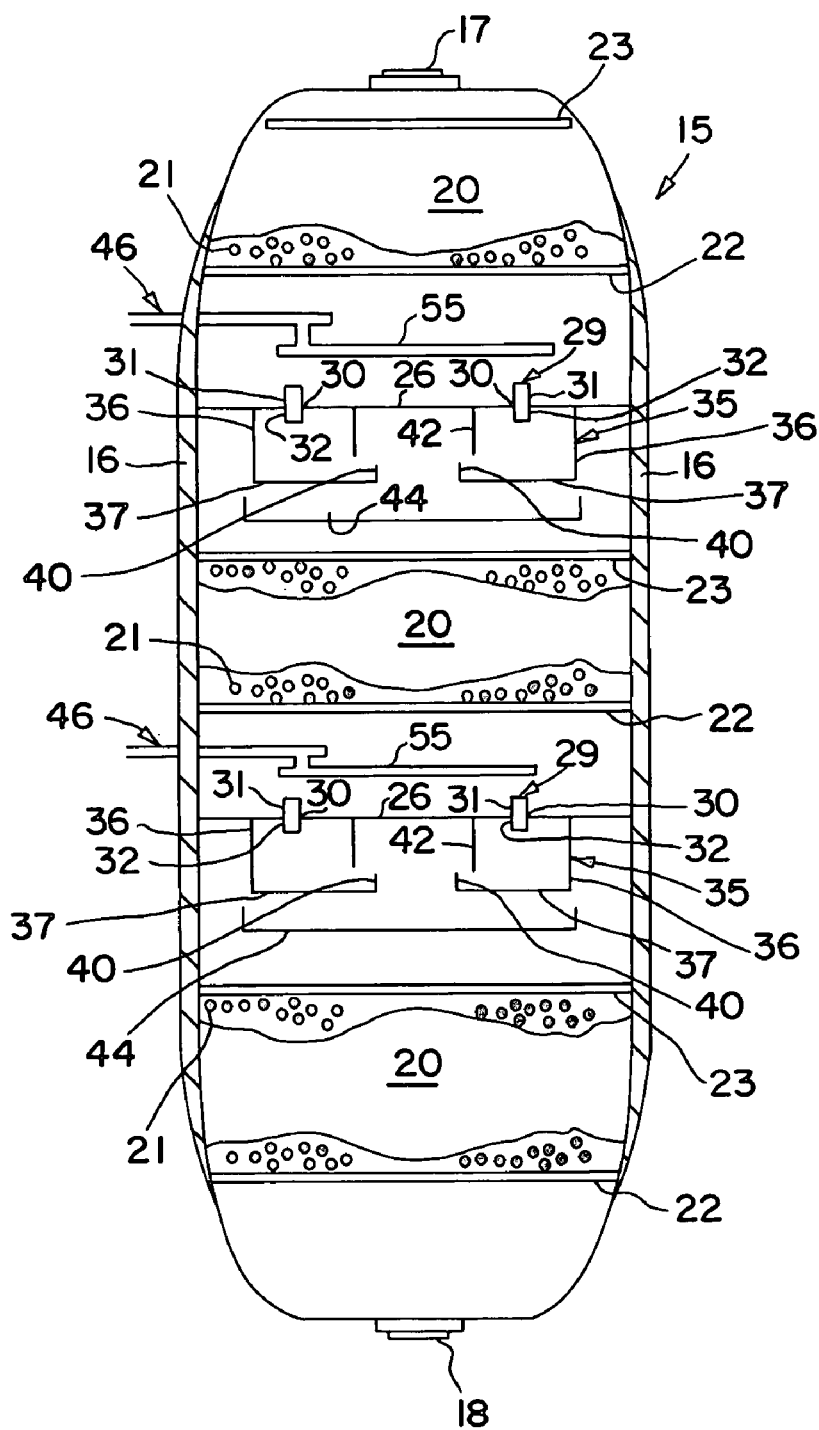
FIG. 1 is a schematic, side-elevational view of a reactor column, shown in cross section.

FIG. 1 shows, in simplified form, a hydroprocessing reactor column in accordance with the present invention. The general configuration of the reactor is conventional, as are details such as the supports for the grids and distributor plates which are not shown for purposes of clarity. The reactor column 15 is formed as a generally cylindrical chamber having an outer wall 16. A reactor inlet 17 and a reactor outlet 18 are provided for introducing and discharging fluids from the reactor column 15. The reactor column 15 further comprises one or more catalyst beds 20 positioned along the longitudinal axis of the reactor column 15. Each of the catalyst beds 20 contains catalyst material 21 which is preferably supported below by a catalyst support grid 22. The catalyst support grid 22, together with the outer wall 16, provides direct support for the catalyst material 21. Alternatively, the catalyst support grid 22 may provide indirect support for the catalyst 21 by retaining one or more layers of a larger supporting solid or solids which in turn support the catalyst 21. A distribution tray 23, for facilitating even distribution of fluids over the catalyst 21, is preferably provided above the catalyst material 21. The catalyst support grids 22 and the distribution trays 23 comprise meshed or perforated portions having openings sufficiently large to allow fluids to pass therethrough. In addition, the openings in the catalyst support grids 22 are sufficiently small so as to prevent the catalyst 21 from passing through. Further, it will be appreciated that the openings in the distribution trays 23, and any flow devices which may be associated with the openings in the distribution trays 23, should be sized and spaced such that fluids deposited onto the distribution tray 23 are generally forced to spread substantially over the distribution tray 23 before passing through distribution tray 23.

The spaces between successive catalyst beds define interbed mixing zones. The interbed mixing zones function, in part, to provide a homogeneous mixture of reactants to the catalyst beds 20. Additionally, the interbed mixing zones provide a convenient position for introducing quench fluids and/or supplemental reactants into reactor column 15. Although the embodiment shown in FIG. 1 contains three catalyst beds 20 and two interbed mixing zones, it will be appreciated by those skilled in the art that the reactor in accordance with the present invention may contain more or less than three catalyst beds and more or less than two interbed mixing zones.

A mixing system is positioned within at least one of the interbed mixing zones. The mixing system comprises a collection tray 26 which extends generally perpendicular to a longitudinal axis of reactor column 15. Collection tray 26 spans substantially across the entire diameter of reactor column 15 so as to divide the interbed mixing zone into an upper and a lower region. Accordingly, collection tray 26 collects fluids passing through the catalyst bed 20 which is positioned above collection tray 26.

One or more passageways 29 are provided in collection tray 26 to provide fluid communication between the upper and lower regions of the interbed mixing zone. Accordingly, the passageways 29 permit vapor and/or liquid phases collected above the collection tray 26 to flow downwardly into the lower region of the interbed mixing zone. In the embodiment shown, each collection tray 26 comprises two passageways 29 formed as spillways. Each of the spillways is formed as an opening 30 within the collection tray 26. A first conduit 31 is formed above the opening 30 for directing fluids through opening 30 and a second conduit 32 is formed beneath opening 30 for directing fluids that have passed through opening 30 away from opening 30. It will, however, be appreciated by those of skill in the art that other designs may be utilized. For example, the passageways may comprise open-ended tubes passing through collection tray 26.

Mixing chamber 35 is positioned below collection tray 26 to receive fluids which pass through passageways 29. In the embodiment shown in FIG. 1, the mixing chamber comprises a cylindrical wall 36 attached to, and extending generally perpendicular away from a lower surface of collection tray 26. Mixing chamber 35 further comprises floor 37, extending generally horizontally from cylindrical wall 36 upon which fluid can collect. Weir 40 is positioned generally peripherally at the end of floor 37 as a retaining wall extending perpendicularly and upwardly from floor 37 of mixing chamber 35. Fluids must therefore flow over weir 40 prior to exiting mixing chamber 35. Accordingly, weir 40 functions to retain fluid on the floor 37 of mixing chamber 35 until the level of fluid on floor 37 is about the same as, or higher than the height of weir 40.

Flash pan 44 is optionally positioned within the interbed mixing zone below mixing chamber 35. Flash pan 44 comprises a floor with a retaining wall extending substantially vertically upward about the perimeter of the floor. Flash pan 44 also optionally comprises openings or upstanding pipes to convey fluid through the floor of flash pan 44. Flash pan 44 may be provided to receive fluids as they are discharged from mixing chamber 35 so as to evenly distribute the fluids over the surface of distribution tray 23.

In addition, one or more quench feed lines 46 extend through the wall 16 of reactor column 15 into one or more quench injectors 55 within the interbed mixing zones. Injectors 55 enable a fluid or a gas to be injected into one or more of the interbed mixing zones. Quench feed lines 46 may also enter through the top or bottom head of reactor column 15 and pass through catalyst beds 20 and distribution trays 23 to arrive at an injector 55 within the interbed mixing zone. For example, in a hydroprocessing reactor, hydrogen may be injected as both a quench fluid and as a reactant. In general the quench fluid may be a gas, a liquid or a mixture of gas and liquid. Injectors 55 should provide a uniform, initial distribution of the quench fluid as further described herein.

Although not required in connection with the present invention, FIG. 1 further shows a baffle 42 within mixing chamber 35. As described in applicant's co-pending patent application No. 10/341,123, entitled "Improved Multiphase Mixing Device with Baffles," filed on Jan. 13, 2003, which is hereby incorporated by reference, baffle 42 facilitates the mixing of fluids within mixing chamber 35. In FIG. 1, baffle 42 extends perpendicularly and downwardly from the bottom of collection tray 26.

According to the specific teachings of the present invention, quench fluid mixing is significantly improved by selecting one or more quench injection points such that (i) the accompanying lateral velocities of process fluids in the region are low, (ii) sufficient volume is available for the quench fluid to mix with the process fluids, and (iii) the quench is introduced with a velocity which is principally opposed to that of the process fluid transverse velocity. By identifying where process fluids pass through the collection tray 26, and by examining the paths that process fluids travel as they approach the openings in collection tray 26, the best location for the associated injector(s) 55 can be determined in accordance with the teachings herein. In most existing downflow reactors, the openings in the collection tray 26 are at or near the center of reactor 15. In such cases, process fluids exiting downward through the catalyst support grid must travel generally horizontally along or above collection tray 26 toward the openings in collection tray 26. Further, if the space above the collection tray 26 is mostly empty volume free of obstructions, then the flow paths will proceed directly toward the openings. In cases where baffles are present on the collection tray 26 on the upper surface of collection tray 26, the flow paths will proceed toward the openings by a more indirect route defined by the baffles.

Depending upon where the process fluid flow paths fall, according to the first and third criteria of the present invention, quench is injected where the process fluids are traveling at a low relative velocity and such that the quench is injected in a direction opposite that of the process fluid flow. In general, this dictates that quench be injected nearer to the wall 16 of reactor 15 and in an outward direction. However, it is also preferable according to the second criteria of the present invention to ensure adequate mixing space between the injection point(s) and the reactor wall 16 in order to maximize mixing efficiency. The process for determining the appropriate injection point(s) to meet the aforesaid three criteria and systems resulting from such determination is discussed herein in detail in the following description.

In one embodiment of the present invention, the methodology for locating quench injectors is based upon the use of interbed designs with openings through the collection tray 26 that are substantially in the center of the collection tray 26. In this case, locating injection points such that lateral process fluid velocities are low and mixing volume is maximized dictates a minimum and a maximum radius within which the quench fluid is preferably injected. This invention is not, however, necessarily limited to use with interbed designs in which openings are close to the center and the teachings may also be applied to applications in which openings are spaced closer to the periphery of reactor 15.

Figure 2A:
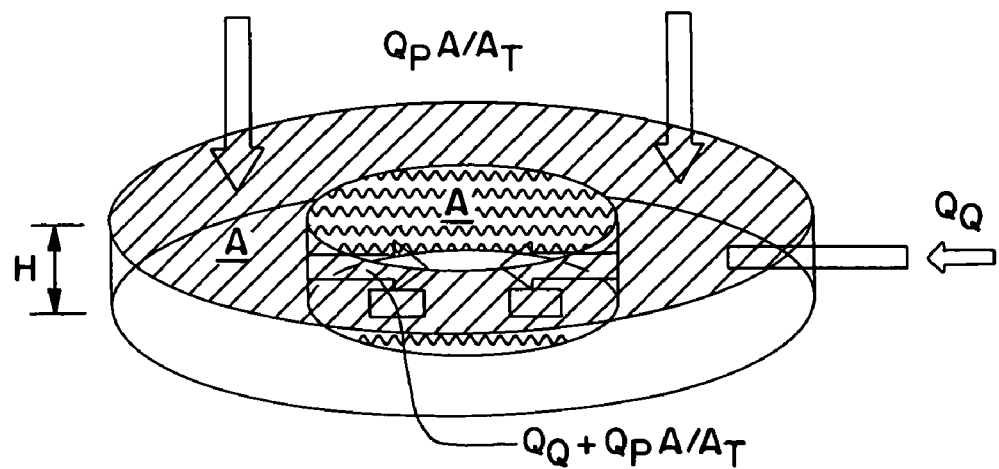
FIG. 2(a) is an oblique view of the volume above the collection tray extending outward to the wall of the reactor column with such view illustrating the dimensions used to determine optimal placement of quench injection points according to the teachings of the present invention.
Figure 2B:
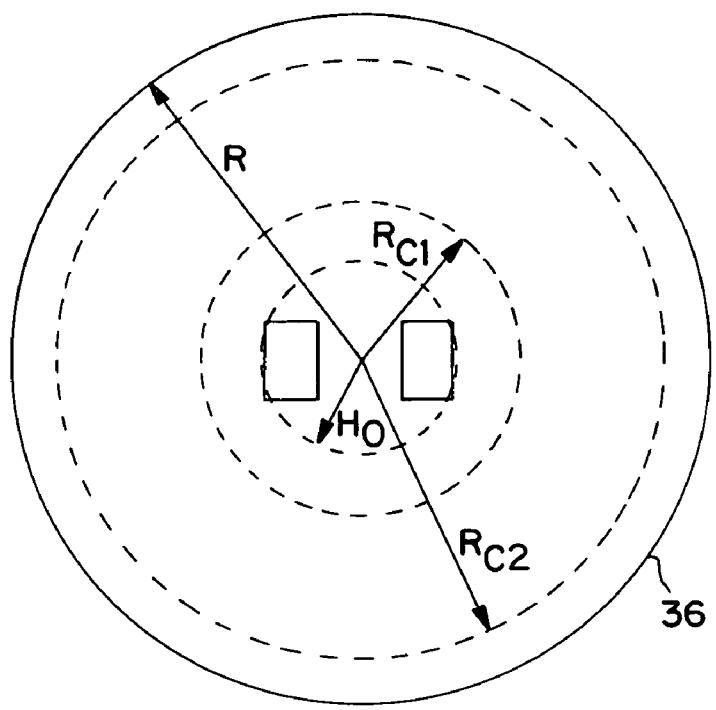
FIG. 2(b) is a plan view of the region interior to the reactor column with such view illustrating the dimensions used to determine optimal placement of quench injection points according to the teachings of the present invention.

Turning now to FIG. 2, the teachings of the present invention with respect to locating quench injectors at or near points of low process fluid velocities are next discussed. The low velocity region of the headspace above collection tray 26 can be defined as the region where the kinetic energy square root ratio of the quench flow and transverse process fluid flow is greater than a critical value. The preferred value according to the teachings herein depends specifically upon process conditions and design safety factors, but experimental results indicate that the optimal ratio is in the range of 3 to 150. The kinetic energy square root ratio of the quench flow to transverse process fluid flow $(KE_Q/KE_X)^{1/2}$ at any radius in vessel 15 is given by:

$$(KE_Q/KE_X)^{1/2} = f(Q_Q, Q_P, \rho_Q, \rho_P, A_Q, H, R, r).$$

where $Q_Q$ and $Q_P$ are the quench and process fluid volume flow rates respectively, $\rho_Q$ and $\rho_P$ are the respective fluid densities, $A_Q$ is the total cross-sectional area for flow of the quench injectors at the point(s) of discharge, H is the height of the fluid layer on the collection tray of the same phase as the quench fluid, R is the inner radius of vessel 15 and r is any arbitrary radius less than R measured from the center of vessel 15.

The function f is derived as illustrated in Appendix 1. According to the teachings of the present invention, the function f is solved for the value of r which results in the kinetic energy square root ratio being equal to a target value chosen between 3 and 150. Higher values should be targeted in applications where precise temperature control is particularly important. The value of r thus obtained is the minimum radius $R_{C1}$ within which quench injection points should be located in order to obtain the benefits of the teachings of the present invention, that is, to create the most favorable conditions for quench fluid mixing. In this way, the first criteria for optimum quench injection, namely locating injection points in the region of low process fluid velocity, can be satisfied.

If the region containing the openings through the collection tray can be circumscribed by a circle of radius $R_o$ which is greater than the minimum defined by $R_{C1}$ as calculated above with respect to the first criteria, then $R_o$ itself becomes the minimum radius for locating the quench injection point(s). In any event, the first and third criteria dictate, respectively, that (i) the quench fluid is injected at a radius $R_Q$ which is greater than $R_{C1}$ and (ii) the quench fluid flows in a direction which is counter to the transverse process fluid flow (i.e. substantially outward in the radial direction).

Regarding the second criteria, quench mixing performance is enhanced when the volume available for mixing exceeds a critical fraction of the total volume above collection tray 26. As with the kinetic energy square root ratio used in the first criteria, the preferred volume fraction for quench fluid mixing is application specific, but experimental results indicate an optimal value between 0.03 and 0.45. A larger value should be targeted in applications where precise temperature control is particularly important. The ratio of available quench mixing volume to total volume is given by:

$$V_M/V_T = g(R, r)$$

Here, R and r are defined as in the first criteria and g is a geometric function derived as illustrated in Appendix 2. By solving for the value of r which results in a target value of $V_M/V_T$ chosen between 0.03 and 0.45, the maximum radius $R_{C2}$ within which quench injection should occur may be obtained. Insufficient volume for mixing results between the quench inlets and the wall 16 of reactor 15 if $R_Q$ exceeds $R_{C2}$.

In the event that reactor 15 employs openings through collection tray 26 at or near the center of the vessel and in cases where baffles are not present on the upper surface of collection tray 26 to induce other than substantially radially inward flow, combining the first and second criteria leads to the conclusion that the preferred means of quench injection is attained when the injection points are located in a zone between 20% and 90% of the radius of reactor 15. The third criteria dictates that the quench fluid be directed substantially radially outward.

This preferred location and direction of quench injection, in cases where process fluids pass through one or more centrally located openings in collection tray 26, result from the radial symmetry of the flow domain. This symmetry allows the locations of multiple central outlets to be described by a one-parameter boundary, which is a circle of radius $R_o$, dividing the volume associated with the outlets from the rest of the volume above collection tray 26. Further validation of the concept comes from the fact that the transverse flow crossing the circle of radius $R_o$ is approximately radially inward so that the path length followed by the fluid elements can be parameterized in terms of radius. Recognition of these features permits the above criteria to be extended to reactors and other vessels having other geometries, and it will be understood by one of skill in the art that the teachings of the present invention are not necessary limited to vessels with circular cross sections or any other class of cross sections or geometries.

For example, one possible alternative application of the present invention may be an interbed design wherein the principal flow through collection tray 26 is via openings disposed near the wall 16 of reactor 15. In this case, the low velocity region for process fluid would be in the center of reactor 15. The openings can still be separated from the rest of the domain by a circular boundary. The only difference between this case and the case described above is that the cross-sectional area outside of the boundary is related to the radius r in a different way and thus changes the functions "f" and "g" described above accordingly. The critical constraints of the present invention, however, remain unchanged. Quench fluid should be introduced in a low velocity region $((KE_Q/KE_P)^{1/2}$ greater than 3 to 150) of sufficient volume ($V_M/V_T$ equal to 0.03 to 0.45) with a velocity substantially opposite that of the process fluid.

According to the teachings of the present invention, the process for determining the optimal location for injection points may also be applied to interbed systems wherein substantially vertical baffles on the upper surface of collection tray 26 prevent process fluid from following a direct radial path to the openings in collection tray 26. In the case of a spiral baffle as in, for example, the '896 patent cited above, fluid is forced to follow a longer path to a central opening, thereby increasing mean residence time on collection tray 26. As a result, extended contact between the fluids from different regions of reactor 15 is attained. In this case, the angular coordinate θ serves as a one-parameter boundary with which the fluid flow paths may be parameterized, and along which the location of the outlet(s) in the collection tray may be defined.

Figure 3A:
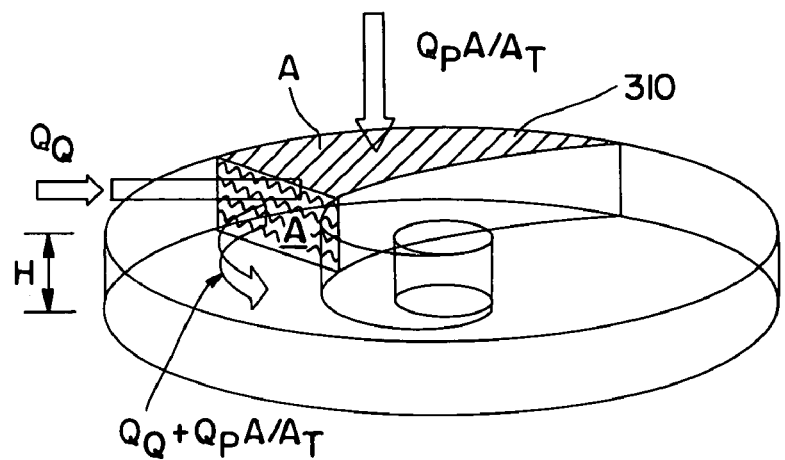
FIG. 3(a) is an oblique view of the volume above the collection tray extending outward to the wall of the reactor column with such view illustrating the dimensions used to determine optimal placement of quench injection points according to the teachings of the present invention when a spiral baffle is present above the collection tray.
Figure 3B:
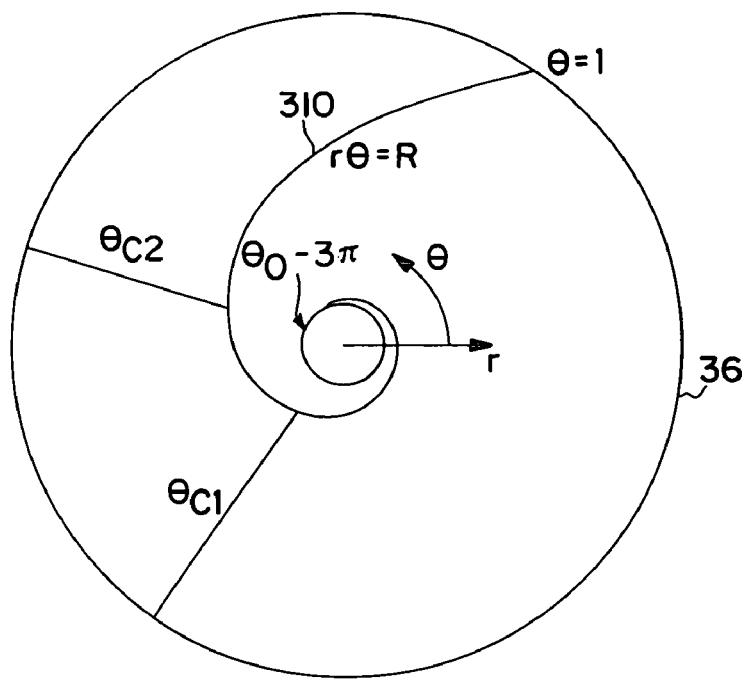
FIG. 3(b) is a plan view of the region interior to the reactor column with such view illustrating the dimensions used to determine optimal placement of quench injection points according to the teachings of the present invention when a spiral baffle is present.

Analogous to the range on $R_Q$ determined in the earlier examples, a preferred range of $\theta_Q$ for maximum quench mixing effectiveness can be determined for the spiral baffle configuration. This is illustrated in FIG. 3. As shown in FIG. 3(a), the cross-sectional area for transverse flow across the collection tray is between the spiral baffle 310 and the wall 16 of reactor 15 (or between the inner and outer segments of baffle 310) as baffle 310 winds to the outlet. The cross-sectional flow area outside the boundary is the wedge-shaped area which forms the ceiling of the channel bounded by the reactor wall and the portion of baffle 310 that is beyond the angle θ. These areas, in this case, are functions of θ rather than r as in the previous examples.

Determining the optimal limits on $\theta_Q$ in the case of a spiral baffle proceeds in a manner similar to that described above by first checking that $(KE_Q/KE_X)^{1/2}$ is in the range from 3–150 and then solving for $\theta_{C1}$, if necessary. Finally $\theta_{C_2}$ is determined by the $V_M/V_T$ ratio using a range of 0.03–0.45. Combining the first and second conditions of low transverse fluid velocity and adequate mixing volume, respectively, leads to the conclusion that the preferred location for quench injection is at an angle between 1 and 4 radians with the quench fluid being injected opposite the process fluid flow direction, which is in the negative angular direction in FIG. 3(b).

Because transverse flow within spiral baffling 310 occurs through a more restricted width than when no baffle is present, the teachings of the present invention may, in some cases, show that there is no region above collection tray 26 that satisfies the low velocity criterion. In other words, it may be determined that the process fluid on collection tray 26 is moving too fast at any location for favorable dispersion and mixing of quench fluid to occur. As such, an additional benefit of the present invention is that it provides a method for determining whether spiral baffling, or baffling of any other geometry, actually adds a benefit in quench mixing efficiency or not.

Figure 4A:
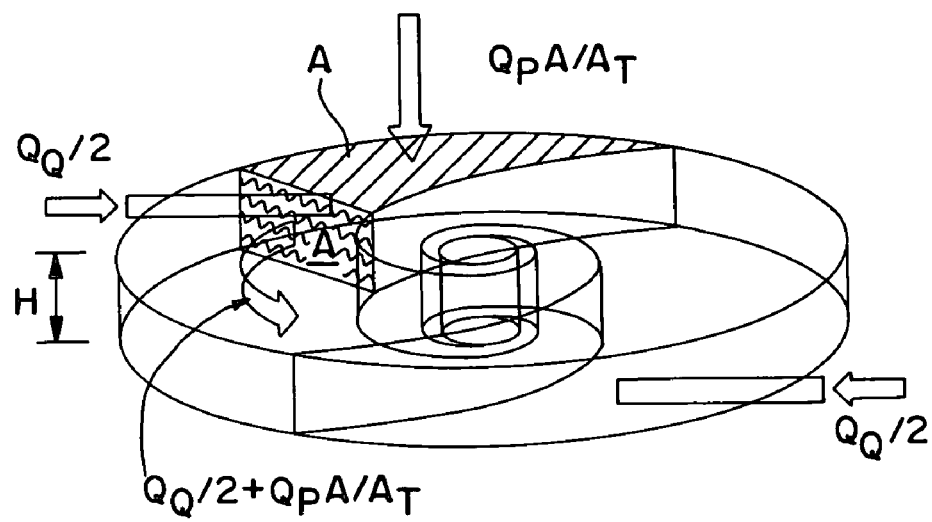
FIG. 4(a) is an oblique view of the volume above the collection tray extending outward to the wall of the reactor column with such view illustrating the dimensions used to determine optimal placement of quench injection points according to the teachings of the present invention when a double spiral baffle is present above the collection tray.
Figure 4B:
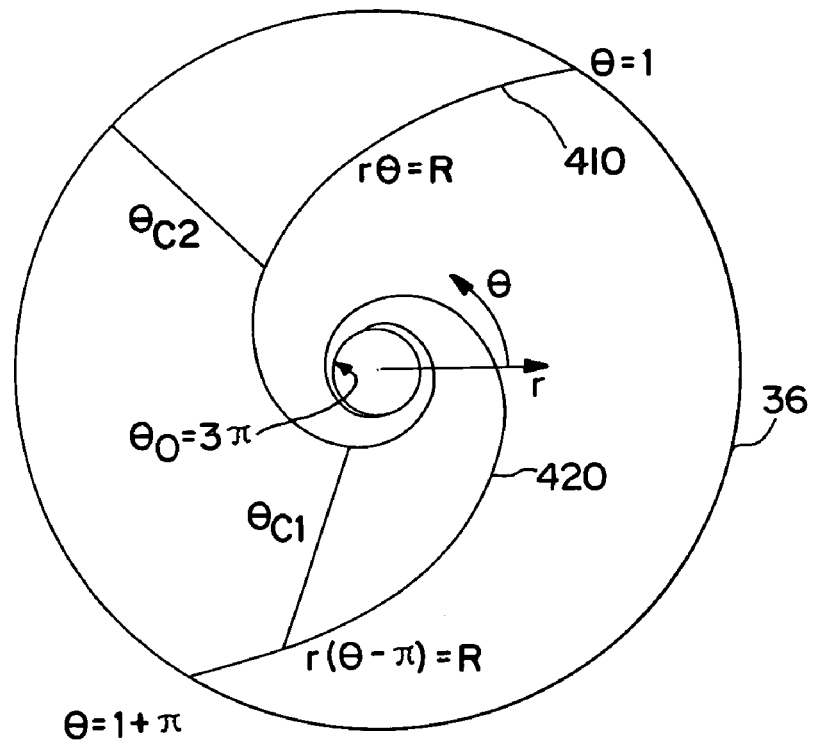
FIG. 4(b) is a plan view of the region interior to the reactor column with such view illustrating the dimensions used to determine optimal placement of quench injection points according to the teachings of the present invention when a double spiral baffle is present above the collection tray.

As a further extension to applications with spiral baffling above the collection tray 26, the teachings of the present invention may be employed in connection with a double baffle design (such as is described in, for example, U.S. Pat. Nos. 5,403,560; 5,554,346; and 5,567,396) where the volume above collection tray 26 is divided into two domains outside the radius of a central opening through collection tray 26. This class of applications is generally illustrated in FIG. 4. In this case spiral baffles 410 and 420 separate the available volume into two identical half-domains. To determine the first limit on quench injection location, namely $\theta_{C1}$, only one of the half-domains need be considered. The volumetric flow rate of the quench fluid must be halved in the calculations to account for being equally divided between the two legs 410 and 420 of the double spiral. However, when determining the second limit on quench injection location, namely $\theta_{C2}$, the full available mixing volume is twice the volume of a single leg of the spiral and must be taken into account. Following otherwise the same procedure as described above for the case of a single spiral baffle, limits on $\theta_Q$ can be determined. Typically the limits define a preferred range of angle between 1 and 6 radians. As with the previously described embodiments, injection should be against the flow of the process fluid resulting in a preferred direction which is in the negative angular direction in FIG. 4.

The double spiral example above demonstrates how multiple paths to the outlet can be treated. Similarly, multiple openings through the collection tray 26 can be analyzed even when they cannot be grouped within a simple boundary as described in the cases parameterized by radius. The domain should be partitioned according to a curve dividing the transverse flow among the outlets. The fraction of quench to each outlet is determined by the location of the injection means. It is unlikely that a multiple outlet geometry would allow use of a spatial coordinate as the single parameter defining both boundary and flow path. However, it is always possible to identify the longest path within the domain and parameterize using arc length along that path. In fact, for the case of a central opening and no baffles, the longest path is a radius from the outer wall 16 (at R) to the internal boundary (at $R_o$), so radius and arc length parameterization are the same.

Figure 5A:
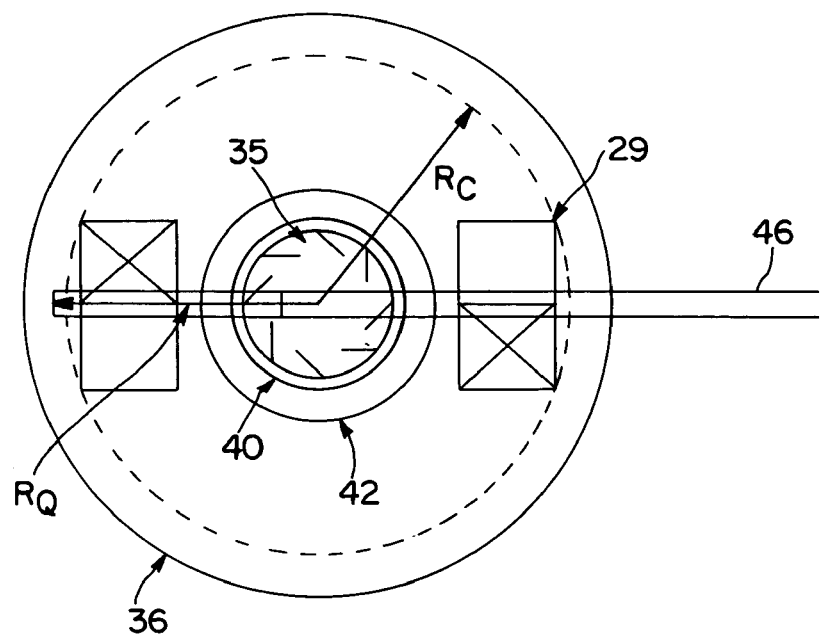
FIG. 5(a) is a plan view of the mixing system of the present invention illustrating the location of the quench injector in a first embodiment of the present invention.
Figure 5B:
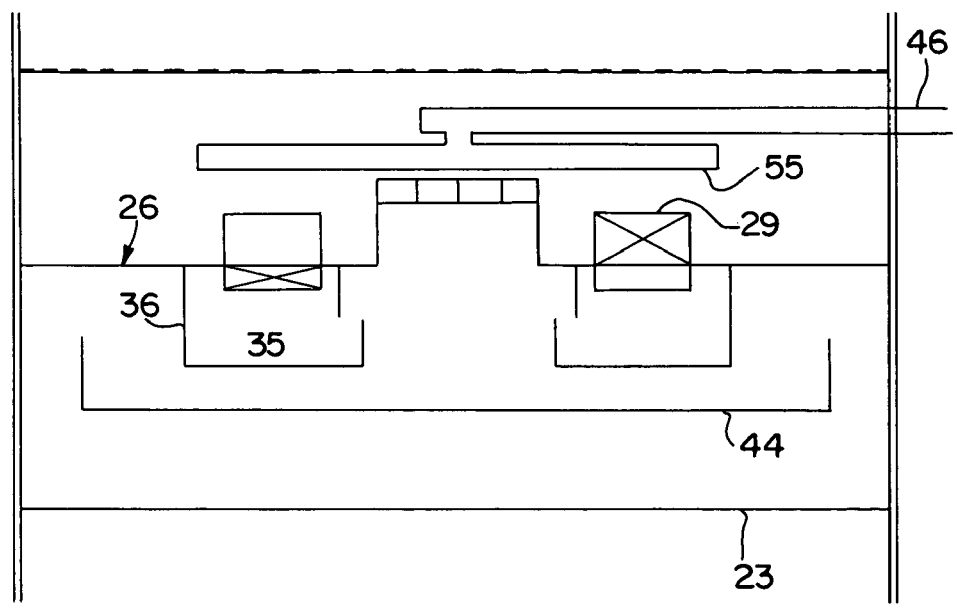
FIG. 5(b) is an elevation view of the mixing system of the present invention illustrating the location of the quench injector in a first embodiment of the present invention.

The actual means of introducing quench fluid according to the teachings of the present invention may take several forms as described in the following embodiments. In these examples, the transverse flow of process fluid is in a radially inward direction implying that the quench should enter flowing substantially radially outward. In one embodiment of the present invention, as illustrated by FIG. 5, quench fluid enters through a piping tee centered in the reactor 15 with arms extending a distance $R_Q$ greater than the minimum radius $R_C$ encircling all openings through collection tray 26.

Figure 6A:
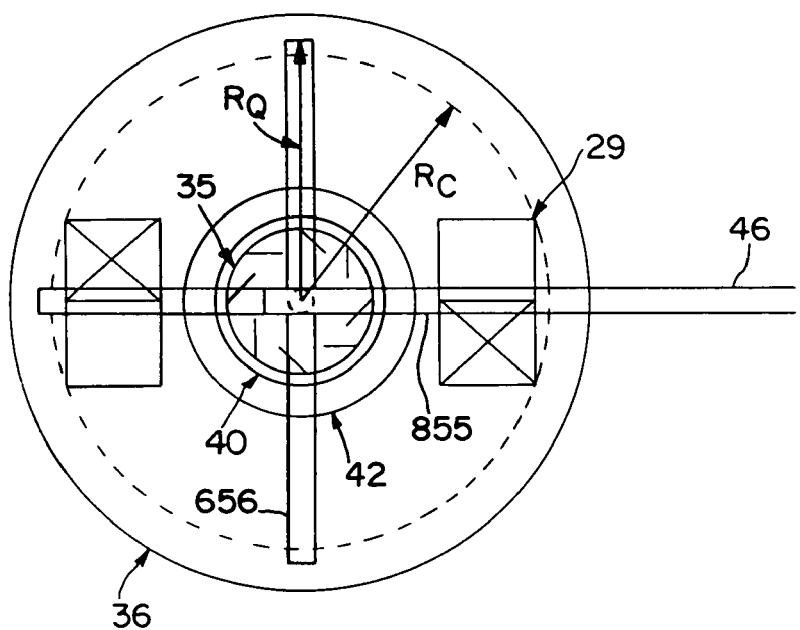
FIG. 6(a) is a plan view of the mixing system of the present invention illustrating the location of the quench injector in a second embodiment of the present invention.
Figure 6B:
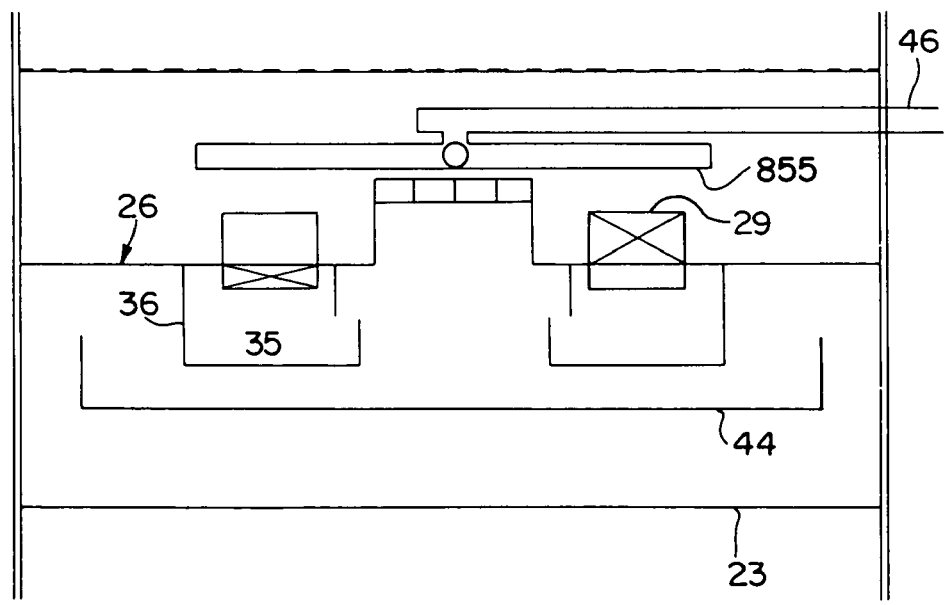
FIG. 6(b) is an elevation view of the mixing system of the present invention illustrating the location of the quench injector in a second embodiment of the present invention.
Figure 7A:
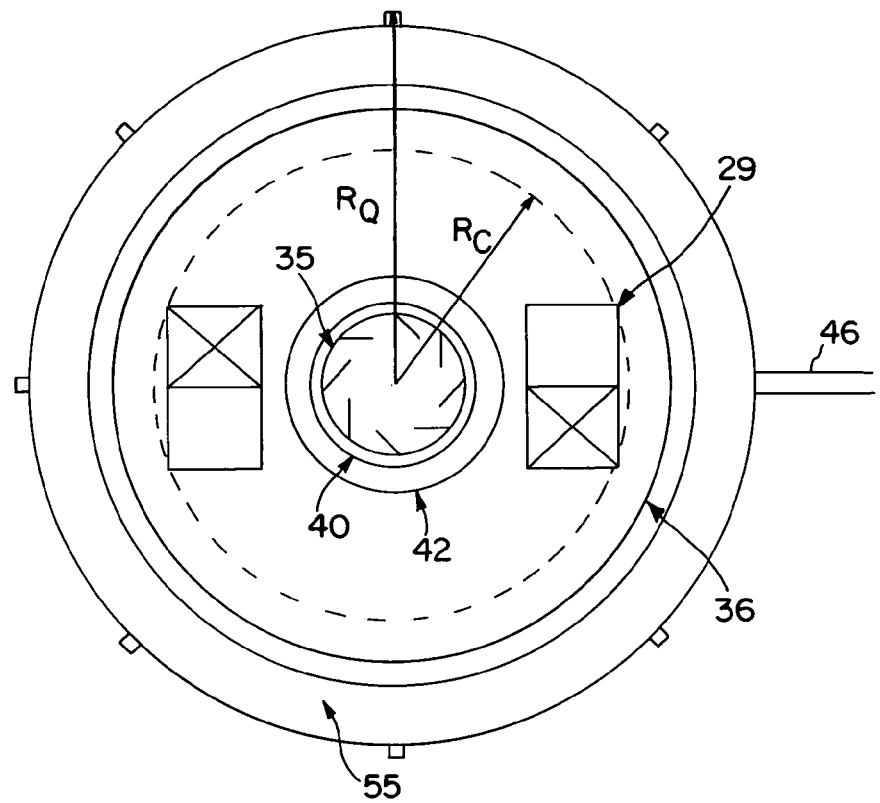
FIG. 7(a) is a plan view of the mixing system of the present invention illustrating the location of the quench injector in a third embodiment of the present invention.
Figure 7B:
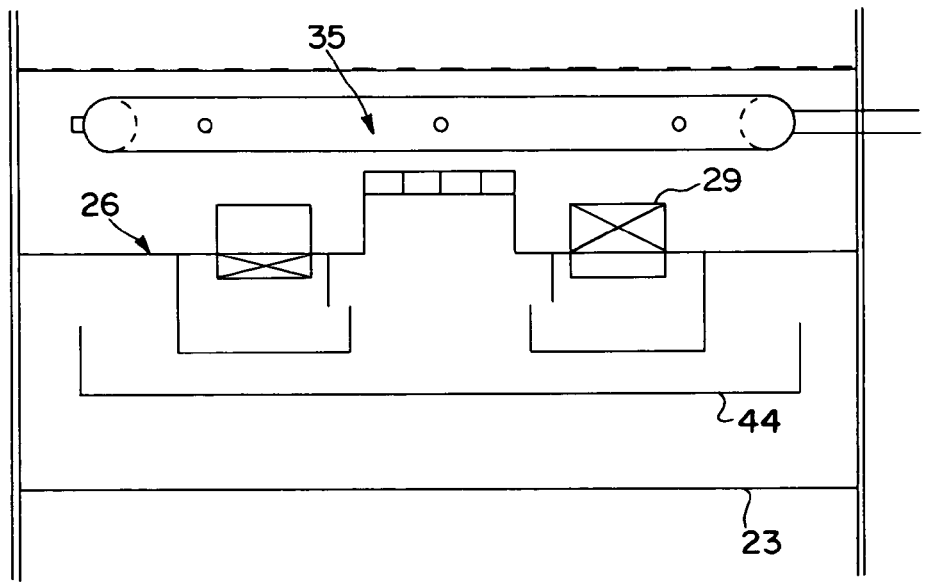
FIG. 7(b) is an elevation view of the mixing system of the present invention illustrating the location of the quench injector in a third embodiment of the present invention.

In yet another embodiment as shown in FIG. 6, quench fluid enters through a branched pipe distributor 655 and 656 having two arms (although additional arms may also be used) where the radius $R_Q$, to which the arms extend, exceeds the radius $R_C$ encircling all openings through collection tray 26. Alternatively, as shown in FIG. 7, quench fluid may be introduced through several inlets from a manifold, duct, or ring which has a radius $R_Q$ greater than the minimum radius $R_C$ encircling all openings in the collection tray 26. Preferably, in this embodiment, the inlets direct the quench fluid horizontally outward in opposition to the transverse velocity of the process fluid which is substantially radially inward.

The above discussion of the present invention describes the optimal placement of quench inlets. However, it will be understood by one of skill in the art that the teachings of the present invention are not limited thereto and the present invention may be applied to applications in which any connecting means is used to connect one or several entrance conduits to a plurality of inlets thus located. The teachings of the present invention do not require that the connecting means be symmetric or disposed in any particular manner relative to the critical radii or angles determined in accordance with the analysis described herein, except for the consideration, which will be obvious to one of skill in the art, that substantially equal quench flows from each of the inlets is preferred.

The following table presents data reflecting quench mixing performance for the invention, with quench injectors extending to various diameters, at fixed operating conditions. Included for comparison are the mean radius of the injection device and the angle formed between the injected quench fluid velocity and the transverse process fluid velocity at the point of injection. The reported mixing index is defined as 100 less the standard deviation of tracer concentration, expressed as a percentage of the mean concentration, from eight sample locations equally spaced around the perimeter of the reactor 15 below the mixing chamber 35. For the operating conditions and reactor configuration used to obtain the data in the table, the analysis taught in the present invention defines the critical radii for optimal location of the quench injection points as $R_{C1}$ from 23.0 to 23.9 inches and $R_{C2}$ equal to 49.0 inches. As can readily be seen from a review of the table, a definite benefit in quench gas mixing is observed only when $R_{C1} < R_Q < R_{C2}$ and the quench flows in a direction opposed to the process fluid.

| Run | Description of Quench Injection Means | Quench Fluid Phase | $R_Q$ (inches) | $R_{C1} < R_Q < R_{C2}$ | Angle $\angle(u_P, u_Q)$ (degrees) | Quench Mixing Index |
|---|---|---|---|---|---|---|
| 97 | 2-Arm Distributor (as in FIG. 5) | GAS | 2.25 | NO | 180 | 90 |
| 98 | 2-Arm Distributor with Slotted End Caps | GAS | 6.88 | NO | 180 | 91 |
| 71 | Central Distributor with No Arms | GAS | 8.00 | NO | 90 | 80 |
| 105 | 8-Arm Distributor (similar to FIG. 6) | GAS | 9.00 | NO | 180 | 88 |
| 102 | 2-Arm Distributor with Closed Ends and Nozzles along Length | GAS | 17.06 | NO | 90 | 91 |
| 103 | 2-Arm Distributor with Closed Ends and Holes along Length | GAS | 18.38 | NO | 0–90 | 90 |
| 106 | 2-Arm Distributor (as in FIG. 5) | GAS | 25.38 | YES | 180 | 95 |
| 99 | 2-Arm Distributor (as in FIG. 5) | GAS | 49.38 | NO | 180 | 90 |

Appendix 1: Derivation of First Criterion for Preferred Quench Injection Location(s)

The following derivation leads to the first criterion for locating quench injection point(s) in a reactor where the openings through the collection tray are substantially in the center of the collection tray. This criterion requires a relationship between radial position from the reactor center and the kinetic energy square root ratio of the quench fluid to the transverse fluid flow, $(KE_Q/KE_x)^{1/2}$. The nomenclature refers to FIG. 2.

The kinetic energy of a fluid stream is the product of the fluid density $\rho$ and the fluid velocity v squared. The fluid velocity v is the quotient of the fluid volume flow rate Q and the cross-sectional area for flow A. Thus in general the kinetic energy of a fluid stream KE is given by:

$$KE = \rho v^2 = \rho \left(\frac{Q}{A}\right)^2.$$

For the quench fluid, the kinetic energy at the point of injection $KE_Q$ is based on the volume flow rate $Q_Q$, the injected quench fluid density $\rho_Q$, and the cross-sectional area of the quench injector(s) $A_Q$:

$$KE_Q = \rho_Q \left(\frac{Q_Q}{A_Q}\right)^2.$$

For the transverse process fluid flow, the kinetic energy $KE_X$ is dependent on radial position because the volume flow rate $Q_X$, the fluid density $\rho_X$, and the cross-sectional area for flow $A_X$ all vary with radius:

$$KE_X(r) = \rho_X(r) \left(\frac{Q_X(r)}{A_X(r)}\right)^2.$$

Since the prevailing direction of the transverse process fluid flow is horizontal and radially inward, the cross-sectional area for flow at a radius r from the reactor center is a circular band of radius r and height H, where H is the height of the fluid layer of the same phase as the quench fluid. (If the quench fluid is liquid, H is the height of the liquid layer on the collection tray. If the quench fluid is gas, H is the height from the liquid surface on the collection tray to the underside of the catalyst support grid). Therefore:

$$A_X(r) = 2\pi r H$$

The transverse fluid volume flow rate $Q_X(r)$ consists of the full quench flow rate $Q_Q$, assumed to be injected at a radius greater than r, plus that fraction of the process flow $Q_P$ which enters the space above the collection tray at a radius greater than r and flows inward across the radius r to reach the centrally located openings in the collection tray. Since the process fluid is assumed to enter the space above the collection tray from the catalyst support grid uniformly at all points, the fraction of the process flow entering outside the radius r is the total flow $Q_P$ multiplied by the ratio of the cross-sectional area outside the radius r, $A(r)$, to the total reactor cross-sectional area, AT. The transverse volume flow rate $Q_X(r)$ is then:

$$Q_X(r) = Q_Q + Q_P \frac{A(r)}{A_T}.$$

The density of the transverse fluid flow $\rho_X(r)$ is an average of the densities of the quench and process fluids, $\rho_Q$ and $\rho_P$ respectively, weighted according to their volume flow rates across the radius r:

$$\rho_X(r) = \frac{\rho_Q Q_Q + \rho_P \left(Q_P \frac{A(r)}{A_T}\right)}{Q_Q + \left(Q_P \frac{A(r)}{A_T}\right)}.$$

(A more rigorous method may be used to determine $\rho_X$ by accounting for the volume change due to mixing or other thermodynamic considerations as an enhancement to the first criterion for locating the quench injection point(s)).

Substituting the three foregoing equations into the expression for $KE_X(r)$ yields:

$$KE_X(r) = \rho_X(r)\left(\frac{Q_X(r)}{A_X(r)}\right)^2 = \frac{\rho_Q Q_Q + \rho_P Q_P \frac{A(r)}{A_T}}{Q_Q + Q_P \frac{A(r)}{A_T}} \left(\frac{Q_Q + \left(Q_P \frac{A(r)}{A_T}\right)}{A_X(r)}\right)^2.$$

This isolates the radial dependence of $KE_X$ to the variation in cross-sectional areas $A(r)$ and $A_X(r)$. The flow rates $Q_Q$ and $Q_P$, the densities $\rho_Q$ and $\rho_P$, and the total reactor cross-sectional area $A_T$ are fixed.

The desired ratio for the first criteria is then:

$$\sqrt{\frac{KE_Q}{KE_X(r)}} = \sqrt{\frac{\rho_Q \left(\frac{Q_Q}{A_Q}\right)^2}{\frac{\rho_Q Q_Q + \rho_P Q_P \frac{A(r)}{A_T}}{Q_Q + Q_P \frac{A(r)}{A_T}} \left(\frac{Q_Q + \left(Q_P \frac{A(r)}{A_T}\right)}{A_X(r)}\right)^2}}.$$

This expression may be simplified by distributing the square root over each term, combining powers of the common term in the denominator, and dividing numerator and denominator by $Q_P \sqrt{\rho_P}$:

$$\sqrt{\frac{KE_Q}{KE_X(r)}} = \frac{\sqrt{\rho_Q}\frac{Q_Q}{A_Q}}{\sqrt{\frac{\rho_Q Q_Q + \rho_P Q_P \frac{A(r)}{A_T}}{Q_Q + Q_P \frac{A(r)}{A_T}}} \left(\frac{Q_Q + Q_P \frac{A(r)}{A_T}}{A_X(r)}\right)}$$

$$\sqrt{\frac{KE_Q}{KE_X(r)}} = \frac{\sqrt{\rho_Q}\frac{Q_Q}{A_Q}A_X(r)}{\sqrt{\rho_Q Q_Q + \rho_P Q_P \frac{A(r)}{A_T}} \sqrt{Q_Q + Q_P \frac{A(r)}{A_T}}}$$

$$\sqrt{\frac{KE_Q}{KE_X(r)}} = \frac{\sqrt{\frac{\rho_Q}{\rho_P}} \frac{Q_Q}{Q_P} \frac{A_X(r)}{A_Q}}{\sqrt{\frac{\rho_Q Q_Q}{\rho_P Q_P} + \frac{A(r)}{A_T}} \sqrt{\frac{Q_Q}{Q_P} + \frac{A(r)}{A_T}}}$$

The total cross-sectional area $A_T$ of a reactor of radius R is given by:

$$A_T = \pi R^2.$$

The cross-sectional area $A(r)$ outside a radius r from the center is a ring-shaped area given by:

$$A(r) = \pi(R^2 - r^2).$$

Thus the area ratio in the denominator of the kinetic energy expression is:

$$\frac{A(r)}{A_T} = \frac{\pi(R^2 - r^2)}{\pi R^2} = 1 - \left(\frac{r}{R}\right)^2.$$

Therefore the ratio needed for the first criteria may be written:

$$\sqrt{\frac{KE_Q}{KE_X(r)}} = \frac{\sqrt{\frac{\rho_Q}{\rho_P}}\left(\frac{Q_Q}{Q_P}\right)\frac{2\pi RH}{A_Q}}{\sqrt{\frac{\rho_Q Q_Q}{\rho_P Q_P} + 1 - \left(\frac{r}{R}\right)^2}\sqrt{\frac{Q_Q}{Q_P} + 1 - \left(\frac{r}{R}\right)^2}},$$

or:

$$\sqrt{\frac{KE_Q}{KE_X}} = g(Q_Q, Q_P, \rho_Q, \rho_P, A_Q, H, R, r).$$

The criterion is implemented by inserting the values of reactor radius R, quench injector cross-sectional area $A_Q$, height of fluid layer of the same phase as the quench H, quench volume flow rate and density $Q_Q$ and $\rho_Q$ respectively, and process fluid volume flow rate and density $Q_P$ and $\rho_P$ respectively, yielding an expression for the kinetic energy square root ratio as a function of radius r from the reactor center only. A desired value of the ratio is then set and the value of r found which matches the target ratio.

Appendix 2: Derivation of Second Criteria for Preferred Quench Injection Location(s)

The following derivation leads to the second criteria for locating quench injection point(s) in a reactor where the openings through the collection tray are substantially in the center of the collection tray. This criteria requires a relationship between radial position from the reactor center and the ratio of the volume available for quench mixing to the total volume, $V_M/V_T$.

The total volume above the collection tray is the product of the total cross-sectional area $A_T$ and the height H:

$$V_T = A_T H,$$

where the height H is interpreted with respect to the fluid of the same phase as the quench fluid as in Appendix 1.

In a reactor of circular cross-section having a radius R, the total cross-sectional area $A_T$ is given by:

$$A_T = \pi R^2.$$

The volume available for mixing between the reactor wall and quench injection point(s) located at a distance r from the center is the product of the cross-sectional area outside the radius r, A(r), and the height H:

$$V_M = A(r)H.$$

The cross-sectional area A(r) outside a radius r from the center is a ring-shaped area given by:

$$A(r) = \pi(R^2 - r^2).$$

The ratio of the volume available for mixing to the total volume is then given by:

$$\frac{V_M}{V_T} = \frac{A(r)H}{A_T H} = \frac{\pi(R^2 - r^2)}{\pi R^2} = 1 - \left(\frac{r}{R}\right)^2,$$

or:

$$\frac{V_M}{V_T} = g(R, r).$$

The radial location corresponding to a desired ratio $V_M/V_T$ is obtained by solving the above equation for r/R:

$$\frac{r}{R} = \sqrt{1 - \frac{V_M}{V_T}}.$$

Thus, for example, if it is desired that the volume available for mixing be at least 20% of the total available volume, $V_M/V_T$ is 0.20 and the above equation dictates that r/R equals 0.894. Therefore the quench injection location(s) should be located inside a circle having a radius equal to 89.4% of the reactor radius.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A mixing system for distributing vapor and liquid across a reactor, comprising:
    a reactor vessel defined by a reactor wall;
    a collection tray for receiving vapor and liquid;
    at least one quench injector for introducing quench fluid into said mixing system at least one injection location above said collection tray; and
    at least one conduit extending through said collection tray into a mixing chamber for permitting the flow of fluid from above said collection tray and into said mixing chamber;
    wherein quench fluid is introduced into said mixing system by said at least one quench injector at the at least one injection location wherein the kinetic energy of the quench fluid at said at least one injection location is greater than the kinetic energy of the transverse process fluid flow at said at least one injection location,
    wherein said at least one injection location is selected such that the kinetic energy square root ratio of the quench flow and transverse process fluid flow, $(KE_Q/KE_X)^{1/2}$, is in the range of 3 to 150.

2. The mixing system of claim 1 wherein the quench fluid is injected in a direction which is opposite that of the transverse process fluid flow.

3. The mixing system of claim 1 wherein the quench fluid is injected in a direction which is opposite that of the transverse process fluid flow and wherein said at least one injection location is at a point which is located outside of a minimum radius, $r_{C1}$, from the center of said reactor vessel.

4. The mixing system of claim 1 wherein said at least one quench injection location comprises a plurality of quench injection locations.

5. The mixing system of claim 1, wherein said at least one quench injector comprises a piping tee.

6. The mixing system of claim 1, wherein said at least one quench injector comprises a branched pipe distributor.

7. A mixing system for distributing vapor and liquid across a reactor, comprising:
    a reactor vessel defined by a reactor wall;
    a collection tray for receiving vapor and liquid;
    at least one quench injector for introducing quench fluid into said mixing system at least one injection location above said collection tray; and at least one conduit extending through said collection tray into a mixing chamber for permitting the flow of fluid from above said collection tray and into said mixing chamber;

wherein quench fluid is introduced into said mixing system by said at least one quench injector at the at least one injection location wherein the kinetic energy of the quench fluid at said at least one injection location is greater than the kinetic energy of the transverse process fluid flow at said at least one injection location, wherein said at least one injection location is at a point which is located outside of a minimum radius, $r_{C1}$, from the center of said reactor vessel.

8. The mixing system of claim 7 wherein said at least one injection location is at a point which is outside of a radius defining a circle which contains all of said conduits extending through said collection tray.

9. A mixing system for distributing vapor and liquid across a reactor, comprising:

a reactor vessel defined by a reactor wall;

a collection tray for receiving vapor and liquid;

at least one quench injector for introducing quench fluid into said mixing system at least one injection location above said collection tray; and at least one conduit extending through said collection tray into a mixing chamber for permitting the flow of fluid from above said collection tray and into said mixing chamber;

wherein quench fluid is introduced into said mixing system by said at least one quench injector at the at least one injection location wherein the kinetic energy of the quench fluid at said at least one injection location is greater than the kinetic energy of the transverse process fluid flow at said at least one injection location, wherein said at least one quench injection location is at a point in which the ratio of quench mixing volume to total volume, $V_M/V_T$, is in the range from 0.03 to 0.45.

10. The mixing system of claim 9 wherein said at least one quench injection location is located inside of a maximum radius, $r_{C2}$, from the center of said reactor vessel.

11. A mixing system for distributing vapor and liquid across a reactor, comprising:

a reactor vessel defined by a reactor wall;

a collection tray for receiving vapor and liquid;

at least one quench injector for introducing quench fluid into said mixing system at least one injection location above said collection tray; and at least one conduit extending through said collection tray into a mixing chamber for permitting the flow of fluid from above said collection tray and into said mixing chamber;

wherein quench fluid is introduced into said mixing system by said at least one quench injector at the at least one injection location wherein the kinetic energy of the quench fluid at said at least one injection location is greater than the kinetic energy of the transverse process fluid flow at said at least one injection location, wherein said at least one quench injection location is within a zone between 20% and 90% of the radius of said reactor vessel.

12. The mixing system of claim 11 wherein the quench fluid is injected in a direction which is opposite that of the transverse process fluid flow.

13. A mixing system for distributing vapor and liquid across a reactor, comprising:

a reactor vessel defined by a reactor walk;

a collection tray for receiving vapor and liquid;

at least one quench injector for introducing quench fluid into said mixing system at least one injection location above said collection tray; and at least one conduit extending through said collection tray into a mixing chamber for permitting the flow of fluid from above said collection tray and into said mixing chamber;

wherein quench fluid is introduced into said mixing system by said at least one quench injector at the at least one injection location wherein the kinetic energy of the quench fluid at said at least one injection location is greater than the kinetic energy of the transverse process fluid flow at said at least one injection location, wherein said mixing system further comprises at least one vertical baffle located above said collection tray, wherein said vertical baffle is a spiral baffle and wherein said at least one quench injection location is at a point which is determined by an angular coordinate boundary, $\theta$.

14. The mixing system of claim 13 wherein the quench fluid is injected in a direction which is opposite that of the transverse process fluid flow.

15. A mixing system for distributing vapor and liquid across a reactor, comprising:

a reactor vessel defined by a reactor wall;

a collection tray for receiving vapor and liquid; and at least one quench injector for introducing quench fluid into said mixing system at a location above said collection tray, wherein quench fluid is introduced into said mixing system by said at least one quench injector at the at least one injection location wherein said at least one injection location is at a point which is located outside of a minimum radius, $r_{C1}$, from the center of said reactor vessel and inside of a maximum radius $r_{C2}$ from the center of said reactor vessel, wherein the quench fluid is injected in a direction which is opposite that of the transverse process fluid flow, wherein said minimum radius, $r_{C1}$, is derived such that the kinetic energy square root ratio of quench flow and transverse process fluid flow, $(KE_Q/KE_X)^{1/2}$, is within a range from 3 to 150.

16. A mixing system for distributing vapor and liquid across a reactor, comprising:

a reactor vessel defined by a reactor wall;

a collection tray for receiving vapor and liquid; and at least one quench injector for introducing quench fluid into said mixing system at a location above said collection tray, wherein quench fluid is introduced into said mixing system by said at least one quench injector at the at least one injection location wherein said at least one injection location is at a point which is located outside of a minimum radius, $r_{C1}$, from the center of said reactor vessel and inside of a maximum radius $r_{C2}$ from the center of said reactor vessel, wherein the quench fluid is injected in a direction which is opposite that of the transverse process fluid flow, wherein said maximum radius, $r_{C2}$, is derived such that the ratio of available quench mixing volume to total volume $V_M/V_T$ is within a range from 0.03 and 0.45.

* * * * *